April 2, 1968   L. M. HUDSON   3,376,090
MODIFIED 4-MEMBER GAUSSIAN PROJECTION OBJECTIVE
Filed Aug. 28, 1964
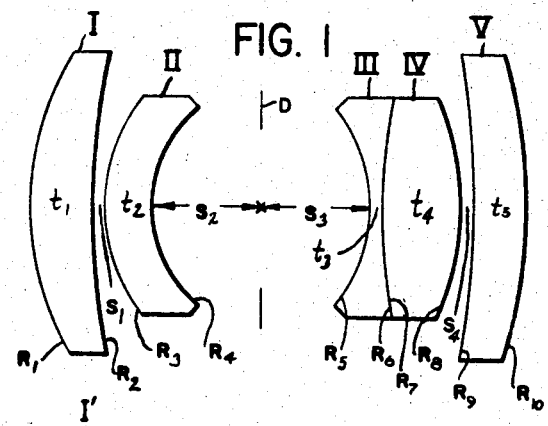
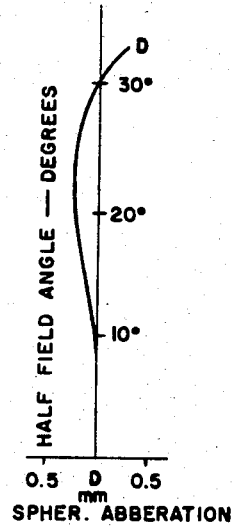
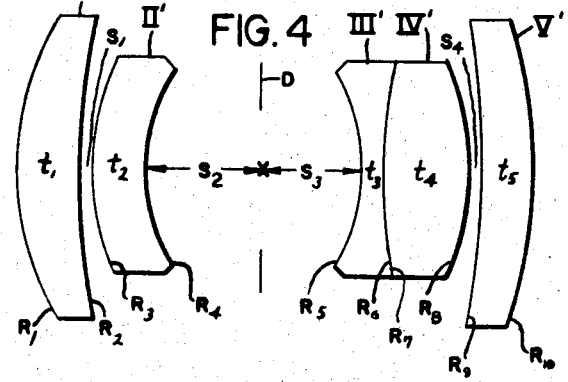
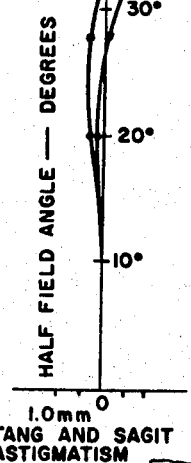
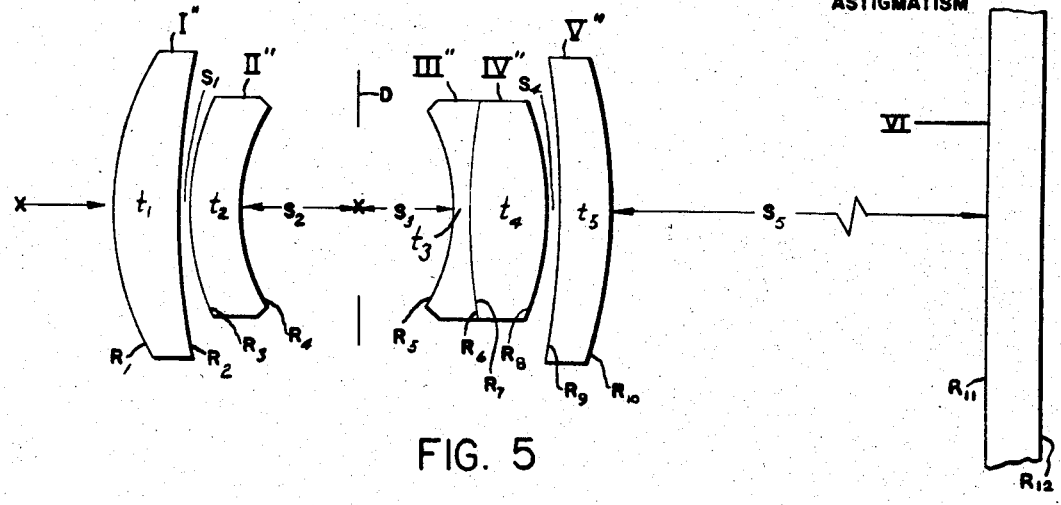
LENA M. HUDSON
INVENTOR
ATTORNEYS

United States Patent Office 3,376,090
Patented Apr. 2, 1968

3,376,090
MODIFIED 4-MEMBER GAUSSIAN PROJECTION OBJECTIVE
Lena M. Hudson, Brighton, N.Y., assignor to Bausch & Lomb Incorporated, Rochester, N.Y., a corporation of New York
Filed Aug. 28, 1964, Ser. No. 392,767
1 Claim. (Cl. 350—209)

ABSTRACT OF THE DISCLOSURE

A modified Gaussian photographic objective having a relatively wide total field angle of at least 64 degrees within which the chromatic and mono-chromatic image aberrations are very well corrected.

---

This invention relates to improved photographic objectives of the type having at least five elements.

The lenses disclosed and claimed herein are applicable for a wide range of uses. For example, a preferred embodiment of the invention is particularly suited for a wide angle lens on a 35 mm. camera. Advantageously, the astigmatism, curvature of field and lateral color are fully corrected for an angle of 32° to thereby provide a full field of 64°. In addition to having well corrected rim rays, the spherical aberration, coma and chromatic aberration on the axis are well corrected.

Additionally, the novel lenses according to a second embodiment of the invention are particularly applicable for aerial photography since it offers exceptionally good correction. For aerial photography the lenses have been constructed having 3″, 6″ and 12″ focal lengths.

Furthermore a third embodiment of the invention having an F number of $f/6.0$ has been found to offer additional advantages as a copying lens. Even though the lenses disclosed herein operate in an advantageous manner at infinite conjugates, they have also been found to operate at finite conjugates with magnifications of around $14.5\times$ to infinity. This lens with a relative aperture of approximately $f/6.0$ has excellent image forming quality over a field of 50° or more.

The lenses according to the present invention are constructed in a manner which should result in additional commercial advantages. For example, the competitive nature of the lens business makes it highly desirable to produce lenses of superior optical performance while maintaining or reducing the manufacturing costs thereof. The present lenses have improved optical characteristics as set forth in the preceding paragraphs and as shown hereinafter, and also comprise a structure which facilitates manufacturing procedures to thereby reduce the overall cost of the finished lens assemblies. For example, only two of the lenses are cemented together while the others are airspaced. Additionally the curves with the exception of the second component and one surface of the third component are relatively flat so that the manufacturing of the individual components is relatively inexpensive for a system of the present type.

Briefly, the lenses according to the present invention include five elements except for the third embodiment which includes six elements. The first two elements comprise a positive and a negative meniscus lens respectively. The third and fourth elements are cemented together and form a complex negative meniscus lens wherein the third element is a double concave lens of negative power while the fourth defines a double convex surface of positive power. The fifth element defines a positive meniscus lens with the two radii facing a diaphragm D. The diaphragm D is located between the second and third elements of the system at an axial distance $S_2$ from front lens element II and distance $S_3$ from rear lens member III. The elements according to the present invention also conform to the data set forth in Table A for any of the three forms shown.

TABLE A

$0.7490F < F_I < 0.9244F$
$1.1761F < -F_{II} < 1.4417F$
$0.2099F < -F_{III} < 0.2575F$
$0.2806F < F_{IV} < 0.3521F$
$0.8253F < F_V < 1.0516F$ $0.0667F < t_1 < 0.0817F$
$0.0566F < t_2 < 0.0693F$
$0.0129F < t_3 < 0.0229F$
$0.0814F < t_4 < 0.0997F$
$0.0543F < t_5 < 0.0665F$
$0 < t_6 < 0.0690F$ $0.0012F < S_1 < 0.0015F$
$0.1083F < S_2 < 0.1443F$
$0.0985F < S_3 < 0.1323F$
$0.0012F < S_4 < 0.0015F$
$0 < S_5 < 0.8135F$

To permit the use of readily available commercial glasses, it is desirable to select the glasses for the respective elements in accordance with the provisions set forth in the following Table B.

TABLE B

$1.6150 < n_1 < 1.6250$
$1.7460 < n_2 < 1.7560$
$1.7150 < n_3 < 1.7250$
$1.7150 < n_4 < 1.7250$
$1.7100 < n_5 < 1.7200$
$1.4740 < n_6 < 1.5740$ $55.3 < \nu_1 < 65.3$
$22.3 < \nu_2 < 32.3$
$24.3 < \nu_3 < 34.3$
$42.5 < \nu_4 < 52.5$
$22.3 < \nu_5 < 32.3$
$54.5 < \nu_6 < 64.5$

The dimensions for the radii of curvature of the various surfaces as multiples of the equivalent focal length F of the entire lens are set forth in the following Table C.

The minus (—) sign used in the table with the R values denotes that such a surface is concave toward the front of the objective so that its center of curvature lies on the front side of the surface.

TABLE C

$0.2966F < R_1 < 0.3647F$
$0.7500F < R_2 < 0.9180F$
$0.2674F < R_3 < 0.3269F$
$0.1866F < R_4 < 0.2281F$
$0.1985F < -R_5 < 0.2445F$
$0.6505F < R_6 < 0.7981F$
$0.6505F < R_7 < 0.7981F$
$0.2777F < -R_8 < 0.3522F$
$2.6445F < -R_9 < 3.6457F$
$0.5063F < -R_{10} < 0.6540F$

The invention will now be described in more detail in connection with the accompanying drawings; in which, FIG. 1 is an optical diagram through an objective lens according to a first embodiment of the invention;

FIG. 2 is a graphical illustration showing the spherical aberrations of the lens shown in FIG. 1;

FIG. 3 is a graphical illustration showing the tangential and sagittal astigmatism of the lens shown in FIG. 1;

FIG. 4 is an optical diagram through an objective lens according to a second embodiment of the invention; and FIG. 5 is an optical diagram through an objective lens according to a third embodiment of the invention.

First embodiment

The objective lens according to a first, i.e., the preferred embodiment of the invention is particularly adapted for use as a wide angle lens on a 35 mm. camera and is illustrated in FIGURE 1. In that form the objective has a relative aperture of approximately $f/2.8$ and a total field angle of approximately 64°. The distinguishing features of the lens element according to the presently preferred embodiment of the invention are achieved by a novel distribution of focal lengths or radii and the thickness and spacings of the elements set forth herein. For example, the preferred values of the radii, thicknesses and spacings in terms of F which is the equivalent focal length are shown in Table D.

TABLE D

| | F |
|---|---|
| $R_1$ | 0.3314 |
| $R_2$ | 0.8345 |
| $R_3$ | 0.2971 |
| $R_4$ | 0.2074 |
| $-R_5$ | 0.2206 |
| $R_6$ | 0.7228 |
| $R_7$ | 0.7228 |
| $-R_8$ | 0.3086 |
| $-R_9$ | 3.3143 |
| $-R_{10}$ | 0.5945 |
| $t_1$ | 0.0743 |
| $t_2$ | 0.0629 |
| $t_3$ | 0.0143 |
| $t_4$ | 0.0906 |
| $t_5$ | 0.0603 |
| $S_1$ | 0.0014 |
| $S_2$ | 0.1203 |
| $S_3$ | 0.1203 |
| $S_4$ | 0.0014 | wherein the minus sign designates those surfaces which are concave toward entrant light.

The following Table E shows the preferred range of values for the radii, thicknesses and spacings of lens elements according to the first embodiment of the invention.

TABLE E $$29.66 < R_1 < 36.45$$
$$75.10 < R_2 < 91.80$$
$$26.74 < R_3 < 32.68$$
$$18.67 < R_4 < 22.81$$
$$19.85 < -R_5 < 24.27$$
$$65.05 < R_6 < 79.51$$
$$65.05 < R_7 < 79.51$$
$$27.77 < -R_8 < 33.95$$
$$298.29 < -R_9 < 364.57$$
$$53.50 < -R_{10} < 65.40$$

$$6.69 < t_1 < 8.17$$
$$5.66 < t_2 < 6.92$$
$$1.29 < t_3 < 1.57$$
$$8.15 < t_4 < 9.97$$
$$5.43 < t_5 < 6.63$$

$$0.13 < S_1 < 0.15$$
$$10.83 < S_2 < 13.23$$
$$10.83 < S_3 < 13.23$$
$$0.13 < S_4 < 0.15$$

The numerical data for the lens system according to a preferred form of the first embodiment of the invention is set forth in the following Table F.

TABLE F

[E.F.L.=100 mm.   B.F.=71.28   fields 64°   $f/2.8$]

| Element | Radius | Thickness or Spacings | Index of Refraction ($n_D$) | Abbe Number ($v$) |
|---|---|---|---|---|
| I | $R_1 = 33.14$ | $t_1$ 7.43 | $n_1 = 1.6200$ | $v_1 = 60.3$ |
|   | $R_2 = 83.45$ | $S_1 = 0.14$ | | |
| II | $R_3 = 29.71$ | $t_2 = 6.29$ | $n_2 = 1.7506$ | $v_2 = 27.8$ |
|   | $R_4 = 20.74$ | $S_2 = 12.03$ | | |
|   |  | $S_3 = 12.03$ | | |
| III | $-R_5 = 22.06$ | $t_3 = 1.43$ | $n_3 = 1.7200$ | $v_3 = 29.3$ |
|   | $R_6 = 72.28$ | | | |
| IV | $R_7 = 72.28$ | $t_4 = 9.06$ | $n_4 = 1.7200$ | $v_4 = 47.5$ |
|   | $-R_8 = 30.86$ | $S_4 = 0.14$ | | |
| V | $-R_9 = 331.43$ | $t_5 = 6.03$ | $n_5 = 1.7506$ | $v_5 = 27.8$ |
|   | $-R_{10} = 59.45$ | | | | wherein $R_1$ to $R_{10}$ are the radii of the lens surfaces and the minus (—) sign means that such a surface is concave toward the front of the objective, $t_1$ to $t_5$ are the axial thicknesses, $S_1$ to $S_4$ are the axial spacings between the successive lenses except $S_2$ and $S_3$ which are the axial distances between the diaphragm D and elements II and III respectively, and wherein $n_1$ to $n_5$ are the indices of refraction and $v_1$ to $v_5$ are the Abbe numbers of the elements I–V respectively.

Second embodiment

The lenses according to the second embodiment of the invention are shown in FIG. 4. Those lenses have been found to be particularly applicable for aerial photography and have been constructed with 3", 6" and 12" focal lengths. The lenses according to this embodiment are particularly well corrected for spherical, astigmatism, distortion, coma and chromatic aberrations. They also have a field angle of approximately 56° and a back focus of about 72 mm. as compared to an equivalent focal length of 100 mm. The values of the radii, thicknesses and spacings of the lens elements in terms of F the equivalent focal length for the second embodiment are shown in Table G.

TABLE G

| | F |
|---|---|
| $R_1$ | 0.3315 |
| $R_2$ | 0.8333 |
| $R_3$ | 0.2971 |
| $R_4$ | 0.2073 |
| $-R_5$ | 0.2218 |
| $R_6$ | 0.7231 |
| $R_7$ | 0.7231 |
| $-R_8$ | 0.3197 |
| $-R_9$ | 2.9383 |
| $-R_{10}$ | 0.5626 |
| $t_1$ | 0.0741 |
| $t_2$ | 0.0630 |
| $t_3$ | 0.0207 |
| $t_4$ | 0.0906 |
| $t_5$ | 0.0604 |

TABLE G (Cont.)

|   | F |
|---|---|
| $S_1$ | 0.0013 |
| $S_2$ | 0.1312 |
| $S_4$ | 0.0013 | wherein the minus sign designates those surfaces which are concave toward entrant light or the front of the objective.

The following Table H shows the preferred range of values in mm. for the radii, thicknesses and spacings of the lens elements according to the second embodiment of the invention.

TABLE H $29.83 < R_1 < 36.47$
$75.00 < R_2 < 91.66$
$26.74 < R_3 < 32.68$
$18.66 < R_4 < 22.80$
$19.96 < -R_5 < 24.40$
$65.08 < R_6 < 79.54$
$65.08 < R_7 < 79.54$
$28.77 < -R_8 < 35.17$
$264.45 < -R_9 < 323.21$
$50.63 < -R_{10} < 61.89$ $6.67 < t_1 < 8.15$
$5.67 < t_2 < 6.93$
$1.86 < t_3 < 2.28$
$8.15 < t_4 < 9.97$
$5.44 < t_5 < 6.64$
$0.12 < S_1 < 0.14$
$11.81 < S_2 < 14.43$
$9.86 < S_3 < 12.06$
$0.12 < S_4 < 0.14$

The numerical data for the lens system according to a preferred form of the second embodiment of the invention is set forth in the following Table J.

TABLE J

[E.F.L.=100  B.F.=72.06  fields 56°  f/2.8]

| Element | Radius | Thickness or Spacings | Index of Refraction ($n_D$) | Abbe Number ($v$) |
|---|---|---|---|---|
| I′ | $R_1 = 33.15$ | $t_1 = 7.41$ | $n_1 = 1.6200$ | $v_1 = 60.3$ |
|  | $R_2 = 83.33$ | $S_1 = 0.13$ |  |  |
| II′ | $R_3 = 29.71$ | $t_2 = 6.30$ | $n_2 = 1.7506$ | $v_2 = 27.8$ |
|  | $R_4 = 20.73$ | $S_2 = 13.12$ |  |  |
|  |  | $S_3 = 10.96$ |  |  |
| III′ | $-R_5 = 22.18$ | $t_3 = 2.07$ | $n_3 = 1.7200$ | $v_3 = 29.3$ |
|  | $R_6 = 72.31$ |  |  |  |
| IV′ | $R_7 = 72.31$ | $t_4 = 9.06$ | $n_4 = 1.7200$ | $v_4 = 47.5$ |
|  | $-R_8 = 31.97$ | $S_4 = 0.13$ |  |  |
| V′ | $-R_9 = 293.83$ | $t_5 = 6.04$ | $n_5 = 1.7506$ | $v_5 = 27.8$ |
|  | $-R_{10} = 56.26$ |  |  |  | wherein $R_1$ to $R_{10}$ are the radii of the lens surfaces and the minus (−) sign means that such a surface is concave toward the front of the objective, $t_1$ to $t_5$ are the axial thicknesses of lens elements I′ to V′, $S_1$ to $S_4$ are the axial spacings between the successive elements except $S_2$ and $S_3$ which are the axial thicknesses between the diaphragm D and elements II′ and III′ respectively and wherein $n_1$ to $n_5$ are the indices of refraction and $v_1$ to $v_5$ are the Abbe numbers of the elements I–V respectively.

Third embodiment

The lens system according to the third embodiment of the invention has been found to operate at finite conjugates with magnification of around 14.5× to infinity. The system has been found to be particularly suitable for use in copying, having a F number of f/6.0 and holding excellent image forming qualities over a field of approximately 50°. The lens elements according to the third embodiment are characterized by the following values of focal lengths and surface radii and thicknesses and spacings of the elements shown in Table K.

TABLE K

|   | F |
|---|---|
| $R_1$ | 0.3296 |
| $R_2$ | 0.8340 |
| $R_3$ | 0.2972 |
| $R_4$ | 0.2075 |
| $-R_5$ | 0.2223 |
| $R_6$ | 0.7255 |
| $R_7$ | 0.7255 |
| $-R_8$ | 0.3202 |
| $-R_9$ | 2.9348 |
| $-R_{10}$ | 0.5670 |
| $R_{11}$, Plano. |  |
| $R_{12}$, Plano. |  |
| $t_1$ | 0.0741 |
| $t_2$ | 0.0630 |
| $t_3$ | 0.0208 |
| $t_4$ | 0.0905 |
| $t_5$ | 0.0603 |
| $t_6$ | 0.0627 |
| $S_1$ | 0.0014 |
| $S_2$ | 0.1312 |
| $S_3$ | 0.1095 |
| $S_4$ | 0.0014 |
| $S_5$ | 0.7395 |

The following Table L shows the range of values for the radii, thicknesses and spacings of a lens system according to the third embodiment of the invention.

TABLE L $29.66 < R_1 < 36.26$
$75.06 < R_2 < 91.74$
$26.75 < R_3 < 32.69$
$18.67 < R_4 < 22.83$
$20.01 < -R_5 < 24.45$
$65.29 < R_6 < 79.81$
$65.29 < R_7 < 79.81$
$28.82 < -R_8 < 35.22$
$264.13 < -R_9 < 322.83$
$51.03 < -R_{10} < 62.37$
$R_{11} = $ Plano
$R_{12} = $ Plano $6.67 < t_1 < 8.15$
$5.67 < t_2 < 6.93$
$1.87 < t_3 < 2.29$
$8.14 < t_4 < 9.96$
$5.43 < t_5 < 6.63$
$5.64 < t_6 < 6.90$ $0.13 < S_1 < 0.15$
$11.81 < S_2 < 14.43$
$9.85 < S_3 < 12.05$
$0.13 < S_4 < 0.15$
$66.55 < S_5 < 81.35$ The numerical data for the preferred form of the lens system according to the third embodiment of the invention are set forth in the following Table M.

TABLE M

[E.F.L.=100.0  B.F.=71.16  field 50°  f/6.0]

| Element | Radius | Thickness or Spacing | Index of Refraction ($n_D$) | Abbe Number ($\nu$) |
|---|---|---|---|---|
| I'' | $R_1 = 32.96$ | $t_1 = 7.41$ | $n_1 = 1.6200$ | $\nu_1 = 60.3$ |
|  | $R_2 = 83.40$ | $S_1 = 0.14$ |  |  |
| II'' | $R_3 = 29.72$ | $t_2 = 6.30$ | $n_2 = 1.7506$ | $\nu_2 = 27.8$ |
|  | $R_4 = 20.75$ | $S_2 = 13.12$ |  |  |
|  |  | $S_3 = 10.95$ |  |  |
| III'' | $-R_5 = 22.23$ | $t_3 = 2.08$ | $n_3 = 1.7200$ | $\nu_3 = 29.3$ |
|  | $R_6 = 72.55$ |  |  |  |
| IV'' | $R_7 = 72.55$ | $t_4 = 9.05$ | $n_4 = 1.7200$ | $\nu_4 = 47.5$ |
|  | $-R_8 = 32.02$ | $S_4 = 0.14$ |  |  |
| V'' | $-R_9 = 293.48$ | $t_5 = 6.03$ | $n_5 = 1.7506$ | $\nu_5 = 27.8$ |
|  | $-R_{10} = 56.70$ | $S_5 = 73.95$ |  |  |
| VI | $R_{11} = $ Plano | $t_6 = 6.27$ | $n_6 = 1.5240$ | $\nu_6 = 59.5$ |
|  | $R_{12} = $ Plano |  |  |  | wherein $R_1$ to $R_{12}$ are the radii of the lens surfaces and the minus sign (−) means that such a surface is concave toward the front of the objective, $t_1$ to $t_6$ are the axial thickness of the lens elements I'' to VI, $S_1$ to $S_5$ are the axial spacings between the successive lens elements I'' to VI except $S_2$ and $S_3$ represent the axial spaces between the included diaphragm D and the element II'' and III'' respectively, and wherein $n_1$ to $n_6$ are the indices of refraction and $\nu_1$ to $\nu_6$ are the Abbe numbers of the elements I–VI respectively.

While the invention has been described in connection with several examples it should be understood that it may be modified and embodied in other forms without departing from the scope of the appended claim.

What is claimed is:

1. An objective lens including six elements, a first of said elements comprising a positive lens I'' and a second of said elements comprising a negative lens II'', a third and a fourth of said elements cemented together to form a complex negative meniscus lens III'', IV'', a diaphragm D separating said second and said third elements, a fifth member V' comprising a positive lens, and a sixth member comprising a glass plate VI, said elements conforming substantially to the following conditions:

References Cited

UNITED STATES PATENTS 2,744,447  5/1956  Berger et al. _____ 350—209
2,799,207  7/1957  Lange _____ 350—209

FOREIGN PATENTS 779,614  7/1957  Great Britain.

DAVID H. RUBIN, *Primary Examiner.*

JEWELL H. PEDERSEN, *Examiner.*

R. J. STERN, *Assistant Examiner.*